United States Patent [19]

Chen

[11] Patent Number: 4,654,140
[45] Date of Patent: Mar. 31, 1987

[54] PRESSURE INDICATING DEVICE FOR INDICATING CLOGGING CONDITION OF A FILTER

[76] Inventor: Yen-Ming Chen, 3401 N. Columbus, No. 3I, Tucson, Ariz. 85712

[21] Appl. No.: 798,938

[22] Filed: Nov. 18, 1985

[51] Int. Cl.⁴ .............................................. B01D 35/14
[52] U.S. Cl. ....................................... 210/90; 210/91; 210/222
[58] Field of Search .................. 210/90, 854, 91, 222; 116/267, DIG. 42, 220, 221, 268; 200/81 R, 82 E, 82 C

[56] References Cited
U.S. PATENT DOCUMENTS
4,498,495  2/1985  Worwood et al. .................... 210/90

Primary Examiner—Frank Sever
Attorney, Agent, or Firm—Cahill, Sutton & Thomas

[57] ABSTRACT

A differential pressure indicator is provided for detecting and indicating a clogging condition of a filter element and subsequently an opening condition of a bypass valve. The indicator also indicates when no filter element is installed in a fluid system. A thermal lockout effective even at high internal fluid differential pressure prevents false actuation of the indicating means at low temperatures due to increased viscosity of the system fluid. A positive locking feature prevents resetting of the indicating means after actuation. Servicing of the filter element is required in order to reset the indicator.

18 Claims, 12 Drawing Figures

PRESSURE INDICATING DEVICE FOR INDICATING CLOGGING CONDITION OF A FILTER

BACKGROUND OF THE INVENTION

This invention relates to differential pressure indicators commonly found in hydraulic systems.

In any hydraulic system wherein fluid such as oil or the like is passed through a filter, it is customary to provide an indicator for indicating when the filter has become loaded with contaminants and requires cleaning or replacement. Since the pressure drop across a filter element increases in proportion to the accumulation of contaminants thereon, a suitable indication can be obtained by an indicator that is actuated when the differential pressure across the filter element reaches a predetermined value. Since the viscosity of fluids normally increases as temperature decreases, pressure drops across the filter element at unusually low temperatures can be higher than the predetermined value, causing false indications even though the filter element is clean. Various temperature control devices have been utilized for preventing false indications at low temperatures.

Pall, in U.S. Pat. No. 2,942,572 issued June 28, 1960, discloses a magnetic differential pressure indicator. In this indicator, a first magnetic element is arranged to attract a second magnetic element as long as two magnetic elements are separated by less than a predetermined distance. The first magnetic element is movable reciprocally with a piston responsive to changes in pressure, and is normally biased toward the second magnetic element by a first spring with predetermined load. The second magnetic element is also movable reciprocally with a piston, and while retained in its un-actuated position by magnetic attraction, is normally biased in a direction away from the first magnetic element by a second spring capable of overcoming the force of magnetic attraction whenever the first and second magnetic elements are separated by the predetermined distance. The second spring propels the second magnetic element to an indicating position whenever the predetermined distance is exceeded. In order to prevent actuation at low temperatures, a bimetallic element is positioned to prevent motion of the second magnetic element. The bimetallic element is comprised of two arcuate inner and outer strip portions of different metals or metal alloys having different coefficients of thermal expansions and joined together by a weld and arranged to bend inwardly with decreasing temperature. At temperatures below 32° F., for example, the bimetallic element contracts inwardly over a flange on second magnetic element, thus preventing a false indication.

Since the second magnetic element is retained in the un-actuated position by the magnetic attraction between the first and second magnetic elements, as the amount of magnetic attraction decreases (which occurs as the square of the distance), a position develops such that the magnetic attraction is only slightly greater than the force of the second spring continuously urging the second magnetic element away from the first magnetic element. Under such circumstances the application of a slight force, such as by vibration, G-forces or the like, to the indicator of U.S. Pat. No. 2,942,572 would cause the separation of the magnets and thus the indication of the existence of a clogged condition even though such does not in fact exist.

Silverwater, in U.S. Pat. No. 3,785,332, issued Jan. 15, 1974 discloses a magnetic differential pressure indicator in which a loose nonmagnetic detent ball is provided to prevent resetting of the indicating signal after actuation, thus assuring that cleaning or replacing of the clogged filter in fact has been performed if the indicator is in its reset state. The detent ball falls down from its orignal position into a recess after actuation in order to prevent a second magnetic element from being pushed close to a first magnetic element. Thus, the second biasing spring can always overcome the magnetic attraction and keeps the second magnetic element in the indicating position. Since the differential pressure indicators may be used in aircraft applications, they must necessarily be small in size and light in weight. The detent ball of U.S. Pat. No. 3,785,332 therefore is very small and light. Once the fluid such as oil accumulates around the detent ball, it will stick to the surrounding wall and thus be unable to fall down in order to perform its function. Another disadvantage of the indicator of U.S. Pat. No. 3,785,332 is that since the indicator has to be inverted to allow the detent ball to fall back to its original position, that indicator can only be installed on removable parts, such as a filter casing. This greatly limits its application.

To overcome the above deficiencies, attempts have been made to utilize devices for positively locking the first magnetic element in a position whereat the magnetic attraction is less than the biasing force of the second spring. In this case, false indication at low temperature cannot be prevented simply by preventing motion of second magnetic element at low temperatures. This is because the first magnetic element will be moved toward and locked in position due to high pressure drops that will occur at low temperatures. As the temperature exceeds a certain level, the second spring will overcome the magnetic attraction and cause a false indication. Since the bimetallic elements are inherently fragile, they will be damaged if arranged to restrain motion of the first magnetic element. To overcome these difficulties, another Silverwater reference, U.S. Pat. No. 4,172,971, discloses a magnetic differential pressure indicator. In this indicator, the first magnetic element is arranged movably with a tubular sleeve concentric to and slidable within an enclosing hollow piston. A bimetallic element is disposed inside the tubular sleeve. When temperature is above the certain or selected value, the tip of the bimetallic element is turned to extend through a passage in the tubular sleeve and projected into a groove on the piston, so that the tubular sleeve and hollow piston move together so that the first magnet is responsive to the differential pressure. At low temperatures, the tip of the bimetallic element is out of the groove in the piston; therefore the sleeve is not linked to the piston, so that the first magnet does not respond to the differential pressure. This prevents false indication at low temperatures. A detent spring is provided as the positive locking element. It engages the sleeve by entering a groove on the sleeve when the sleeve moves with the piston to the predetermined distance. One disadvantage of this device is that due to dimensional tolerance of individual pieces, the detent spring may have engaged the sleeve before actuation occurs, or may not engage the sleeve when actuation already occurs. This either results in an inoperative indicator or loss of the non-resettability feature until more contaminants are built up. Another disadvantage of this indicator is that while it is not desirable to have too much clamping force imposed on the sleeve by the detent spring, which clamping force the bimetallic element has to overcome, it is required that the detent spring be able to contract to engage the groove on the sleeve and withstand the first spring biasing force. This requires precision calibration. A further deficiency of the device of U.S. Pat. No. 4,172,971 is that when one pushes on the sleeve to reset the indicator internally, damage of the bimetallic element is likely to occur, since the tip of the bimetallic element is still in the groove on the piston if the temperature of the fluid is above the preselected value.

Conventional filter devices are normally incorporated with a by-pass mechanism that is responsive to a predetermined pressure drop across the filter element. Above this predetermined pressure drop, the by-pass mechanism is opened and unfiltered, contaminated fluid is circulated through the system. The by-pass mechanism is normally set to open when the filter element is further clogged beyond the level required to actuate the clogged condition indicator. Thus, the by-pass mechanism serves as a safety device when cleaning or replacement of the filter element is neglected or when it is impossible to service the filter, for example, under in-flight conditions. Up to now, aircraft specifications have required the use of two separate indicators for a filter, to indicate clogging of the filter element and that opening of the by-pass mechanism is about to occur or has occurred, respectively. Such duplication of indicators results in increased costs and cumbersome configurations. In addition to the aforesaid disadvantage, all of the prior art devices fail to indicate when no filter element is installed in the fluid system. When a system is functioning with no filter element to filter out the contaminants, even for a relatively short time, the resulting damage to the system may be very great. If the system is in operation on an airplane during flight, this may even result in loss of power to the aircraft and danger to human lives. In present filter systems, a safeguard against operation without a filter is provided by a mechanism that prevents installation of the filter housing without a filter element in place. This mechanism results in increased cost and additional weight.

SUMMARY OF THE INVENTION

Accordingly, it is an object of this invention to provide a novel, simple, differential pressure indicator that gives a first signal for indicating a clogged condition of a filter element and a second signal for indicating imminent opening or actual opening of a by-pass mechanism of the filter.

Another object of this invention is to provide a differential pressure indicator that can indicate the absence of the filter element.

Another object of this invention is to provide a differential pressure indicator that is tamper-proof in that it cannot be reset without servicing or replacing the filter element.

A further object of this invention is to provide a differential pressure indicator of the foregoing character which does not respond to increases in pressure drop resulting from low temperature.

Another object of the invention is to provide a differential pressure indicator that has high resistance to shock and vibration.

Another object of the invention is to provide a differential pressure indicator that indicates when no filter element is installed in the fluid filtering system.

Briefly described, and in accordance with one embodiment thereof, the invention provides a differential indicating device for use in a fluid filtering system, and includes a housing having an upper bore and a lower-bore, a piston movable in the lower bore in response to a change in the differential pressure between the high pressure inlet of the filter and the low pressure outlet of the filter, and including a first bias element for urging the piston in a particular direction, and an indicating element movable in the upper bore from a first position indicating that a clean filter is installed in a filter casing to a second position indicating the filter is at least partially clogged, a locking mechanism responsive to the position of the piston for limiting the movement of the indicating element to lock it into the first position if the filter is both clean and properly installed, releasing the indicating element if the difference in fluid pressure exceeds a first level to allow the indicating means to move to the second position, and preventing the indicating element from returning from the second position to the first position unless the clogged filter is removed, and including a control mechanism extending into the first and second bores for magnetically coupling the piston to the locking mechanism in order to cause the locking mechanism to limit the movement of the indicating element in accordance with the position of the piston and hence in accordance with the difference in the fluid pressures. A bimetal temperature sensitive locking element prevents the indicating element from moving from the first position to the second position if the temperature of the bimetal element is less than a predetermined value. In the described embodiment of the invention, the indicating element can also move from the second position to a third position that indicates that the filter is so clogged that fluid which should be filtered is bypassing the filter.

If no filter element is installed in the fluid filtering system, the indicating element remains in the second position.

The above and further objects and advantages of my invention will become apparent from a consideration of the detailed description which follows, especially when considered in connection with the accompanying drawings.

DETAILED DESCRIPTION OF THE INVENTION

Before discussing the drawings in detail, it should be understood that, with the exception of the bimetallic element and locking balls, the operative elements shown are of generally cylindrical construction. Thus, the logitudinal cross-sectional views shown are adequate for a complete disclosure.

Figure 1:
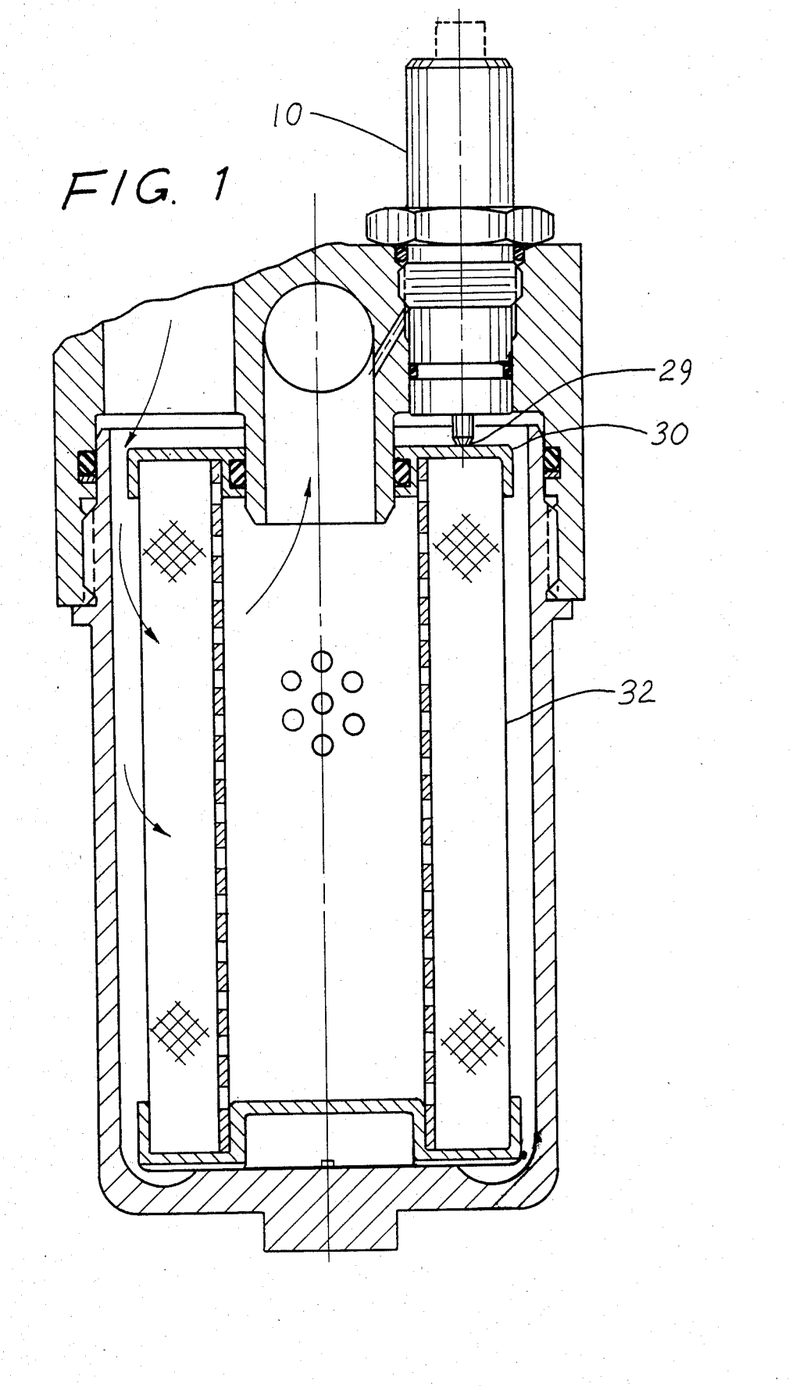
FIG. 1 is a section view of the differential pressure indicator of the invention installed in a filter device.
Figure 2:
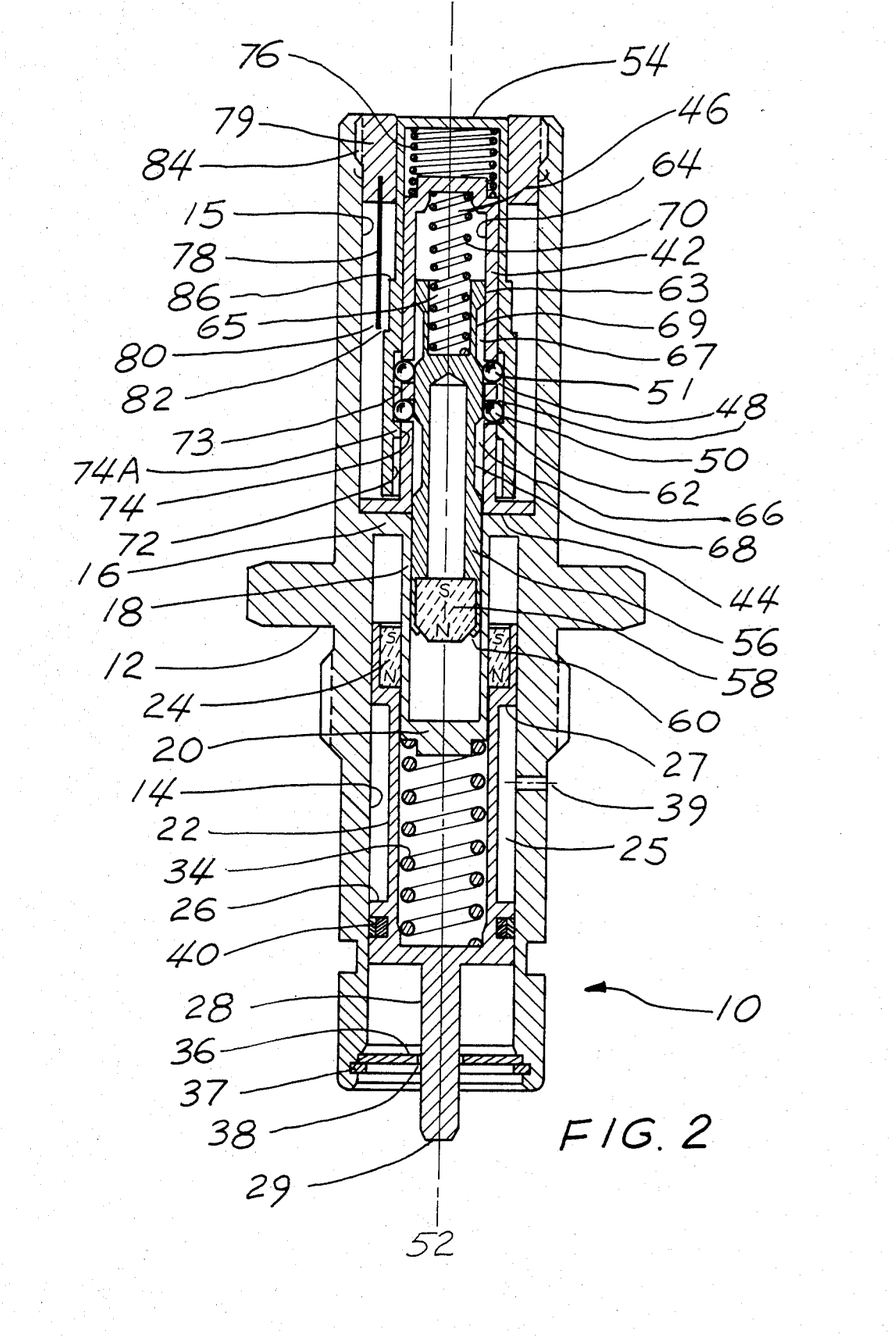
FIG. 2 is a longitudinal section view of the invention showing the piston assembly in its first position, with the differential pressure indicator in its nonindicating position, when a filter element is properly installed.
Figure 3:
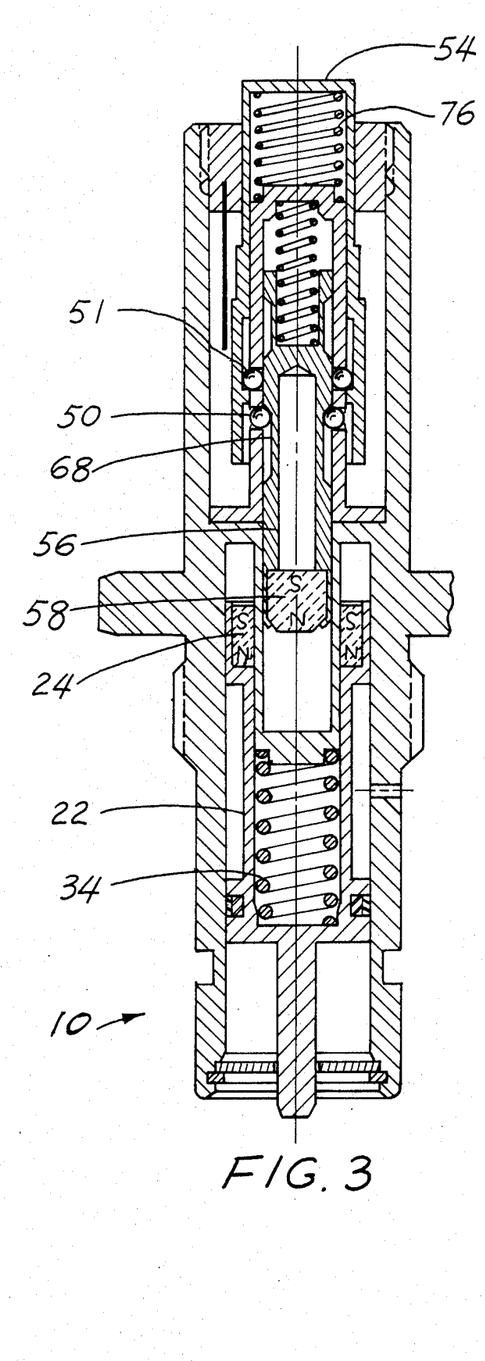
FIG. 3 is a longitudinal section view of the invention showing the piston assembly in its second position, with the differential pressure indicator in the first indicating position.
Figure 4:
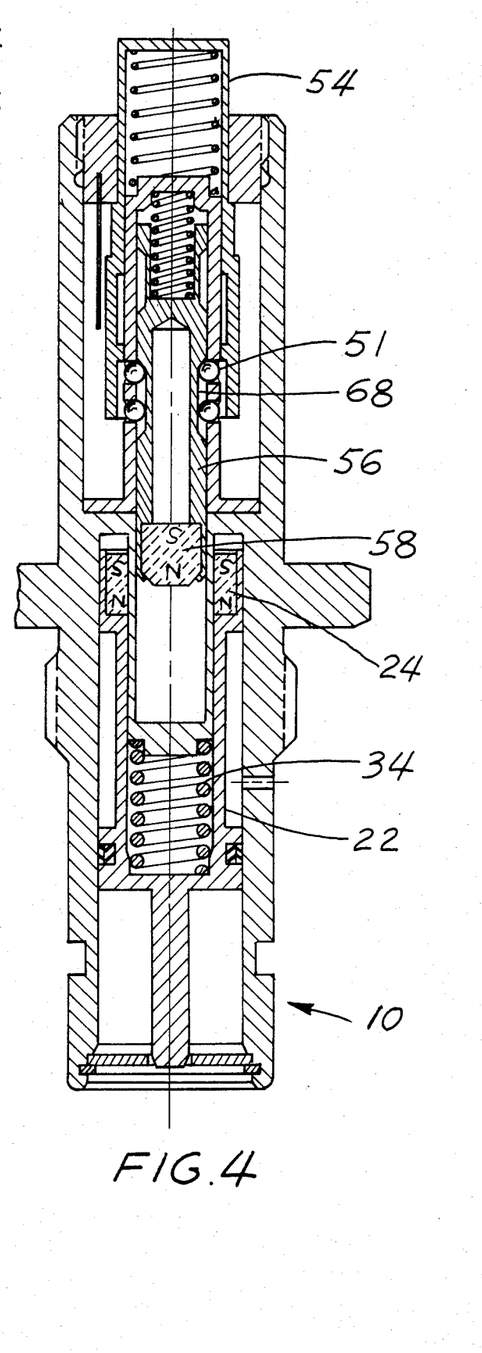
FIG. 4 is a longitudinal section view of the invention showing the piston assembly in its third position with the differential pressure indicator in the second indicating position.
Figure 5:
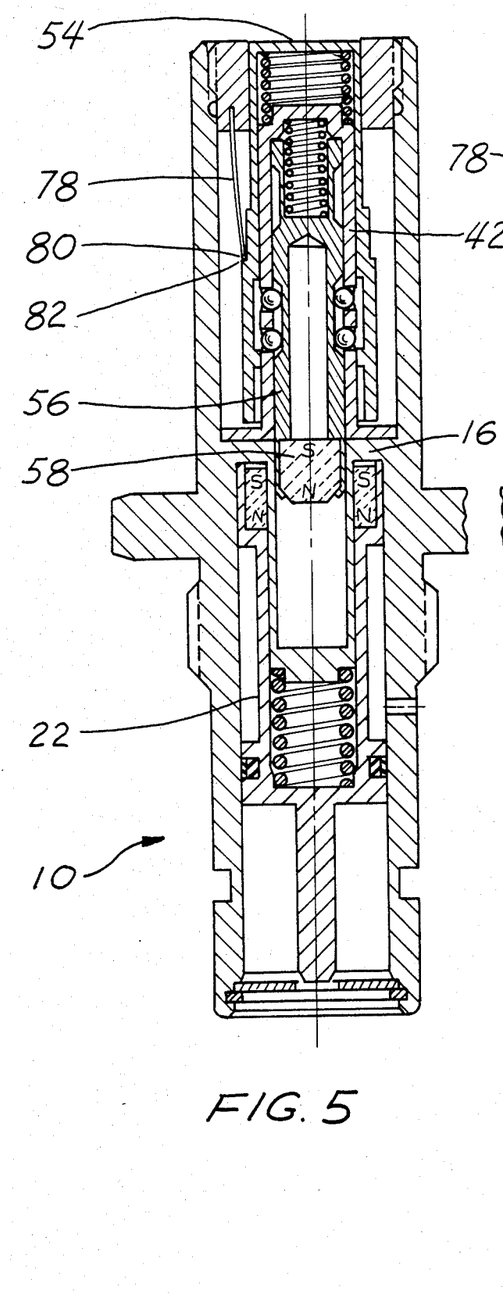
FIG. 5 is a longitudinal section view of the invention showing the differential pressure indicator in the nonindicating position at temperatures below a preselected value.

In FIGS. 1-6, reference numeral 10 designates a differential pressure indicator comprising a housing 12 having a pair of bores 14 and 15 formed from the opposite ends thereof. A wall 16 with a hollow tubular member 18 and a partition or bottom 20 prevents bores 14 and 15 from communicating with each other. Located within bore 14 is a piston assembly 22 that is slidable from a first position as shown in FIG. 2 to a second position, as shown in FIG. 3, and to a third position as shown in FIG. 4. Piston assembly travel is limited by the wall 16 as shown in FIG. 5.

The piston assembly 22 comprises an annular magnet 24 fixed thereto by suitable potting material such as epoxy. The piston assembly 22 has an extending rod 28 with an end 29.

At the first position, the end 29 is urged against the end cap 30 of a filter element 32, as shown in FIG. 1, by a bias spring 34. A washer 36 and a retainer ring 37 are utilized to prevent the piston assembly 22 from being driven out of the bore 14. Clearance hole 38 allows external fluid inlet pressure to be applied to the bottom surface of the piston assembly 22. Piston assembly 22 has an annular recess 25 bounded by an upper ring section 27 and a lower ring section 26, allowing fluid pressure to be applied through fluid passage 39 to the effective upper surface area of piston assembly 22. There is sufficient clearance between the walls of the lower bore 14 and the walls of the piston assembly 22 for pressurized fluid entering lower bore 14 through opening 39 to enter the cavity in which bias spring 34 is disposed.

A seal ring 40 of TEFLON or other suitable gasket material supported by ring section 26 is provided between the bore 14 and the piston 26. The seal may also be effected by close tolerances between the bore and the piston, and the seal ring omitted.

A ball retainer 42 is fixed to housing 12 by adhesive material, such as epoxy, between surface 44 and the wall 16. A chamber 46 is provided inside ball retainer 42.

The ball retainer 42 has in its wall two sets of circular holes 48, preferably three holes in each set, equally spaced in a peripheral direction, respectively retaining equally sized locking balls 50 and 51 so that spherical centers of balls 50 and of balls 51, respectively, are disposed in two parallel planes that are substantially at right angles to axis 52. These two parallel planes are separated by a distance, which can be about one-eighth of an inch, that is the pop-up distance of a signal member 54 that is coaxially, slidably disposed about ball retainer 42. Signal member 54 is shown in the first indicating position shown in FIG. 3.

The side wall of the ball retainer 42 that contains the holes 48 has a thickness which is slightly over one-half of the diameter of locking balls 50 and 51 to properly guide the motions of the locking balls in radial directions. The locking balls 50 and 51 fit closely in their holes to form small annular orifices for restraining air passing therethrough, for reasons to be discussed later herein.

Located within chamber 46 is a control member 56, which is slidable from a first site as shown in FIG. 2 to a second site as shown in FIG. 3, and to a third site as shown in FIG. 4. Control member travel is limited by the ball retainer 42, as shown in FIG. 5. The control member 56 carries a magnet 58 secured by inwardly bent flanges 60 of the control member 56 that abut the shoulder of the magnet 58. The control member 56 has outer surfaces 62 and 63 of the same diameter, which surfaces closely fit the inner surface 64 of the ball retainer 42 for reasons to be discussed later herein.

Surface 62 maintains locking balls 50 and 51 in outwardly protruding positions simultaneously as long as clean filter element 32 (FIG. 1) remains installed in place.

The control member 56 further defines recesses 66 and 67, their outer surfaces 68 and 69, respectively, each having the same diameter. Recesses 66 and 67 allow both sets of locking balls 50 and 51, respectively, to rest simultaneously against surfaces 68 and 69. The tapered upper and lower bounding surfaces of recesses 66 and 67 extend from surfaces 68 and 69, respectively, to the inner wall 64 of ball retainer 42.

A bias spring 70, which is a compression coil spring, is disposed in a recess 65 formed inside the upper end of control member 56, with the upper end of bias spring 70 abutting the upper wall of chamber 46 in ball retainer 42. The bias spring 70 is selected to balance the forces of magnetic repulsion between magnets 24 and 58 at relative locations as shown in FIGS. 3 and 4, respectively. It will be recognized by those skilled in the art that, with like poles of bar magnet 58 and ring magnet 24 oriented in the same direction, they attract each other when the bar magnet 58 is outside of the ring magnet 24 and repel each other when the bar magnet 58 is inside the ring magnet 24. The magnetic repulsive force reaches a maximum when the flat side of the bar magnet 58 is halfway inside of ring magnet 24, if they are of the same length in the vertical direction.

The signal member 54 has inner surfaces 72 and 73 of the same diameter. The radial gap between the inner surfaces 72 of 73 of the signal member 54 and the outer surface 62 or 63 of the control member 56 is substantially the diameter of locking balls 50 and 51. The signal member further has an inner surface 74 of an inner ring 74A disposed between surfaces 72 and 73, with a width (in the vertical direction) smaller than the difference between the distance separating the aforesaid parallel planes and the diameter of locking balls 50 and 51. The gap between the inner surface 74 of the signal member and the recess surfaces 68 or 69 of the control member 56 is substantially equal the diameter of locking balls 50 and 51.

A bias spring 76, which is a compression coil spring, is disposed in the hollow upper end of signal member 54 between its inner top surface and the top of ball retainer 42, and urges the signal member 54 upward toward its first and second indicating positions.

A bimetallic element 78 is attached to a bushing 79 by a conventional clamp or epoxy, and is arranged to bend inwardly with decreasing temperature. At normal temperatures, tip 80 of the bimetallic element 78 has a minimum radius greater than that of shoulder 82 on the signal member 54, thus permitting the signal member 54 to move upward to various indicating positions. However, at temperatures below a preselected value at which the fluid to be filtered increases appreciably in viscosity, the bimetallic element contracts inwardly, so that the tip 80 engages the shoulder 82 and prevents actuation of the differential pressure indicator, as shown in FIG. 5.

The bushing 79 has threads 84 to adjust the gap between the tip 80 and the shoulder 82. The bushing 79 is fixed in place by using conventional adhesive material such as LOCTITE, or by NYLOK. Travel of the signal member 54 is limited by abutment of shoulder 86 with bushing 79.

The operation of the differential pressure indicator 10 will now be described.

At normal operating temperatures, fluid pressure in the inlet line is communicated via the passage or clearance hole 38 to the bottom of the piston assembly 22. Fluid pressure in the outlet line is communicated via the passage 39 to the effective upper surface area of piston assembly 22. As long as a clean filter element 32 (FIG. 1) is installed, and as long as it remains clean, all of the components of the indicator 10 will remain in the positions shown in FIG. 2. As later will become clear, the actuation pressures of the indicator 10 are not affected by variations in length of the filter element, as long as such variation is not great enough to move the piston assembly to the "second position" as shown in FIG. 3. Only the differential pressure at which the piston assembly 22 starts to move away from the end cap 30 varies slightly.

As the filter element 32 (FIG. 1) begins to become clogged, the pressure drop thereacross eventually will result in a force of sufficient magnitude to overcome the preload of spring 34 and cause the piston assembly 22 to move upward away from the end filter cap 30.

When the first predetermined pressure drop is reached, the piston assembly will be moved to the second position or site shown in FIG. 3 and the spring 34 will be compressed to a first predetermined height. Simultaneously, the magnet 58 in control member 56 is repelled by a magnetic repulsion force applied to it by moving magnet 24, and moves to the second site, as shown in FIG. 3, wherein the recess surface 68 of control member 56 is in radial alignment with locking balls 50. When this occurs, the lower set of the locking balls 50 will be wedged radially inwardly, and thus unlock the signal member 54 to allow it to be moved upward by spring 76 to its "first indicating position". The signal member 54 is prevented from moving to its "second indicating position" by the outwardly protruding balls 51, as shown in FIG. 3. The load of spring 34 at its "first predetermined height" is selected in accordance with the first predetermined differential pressure.

Figure 3A:
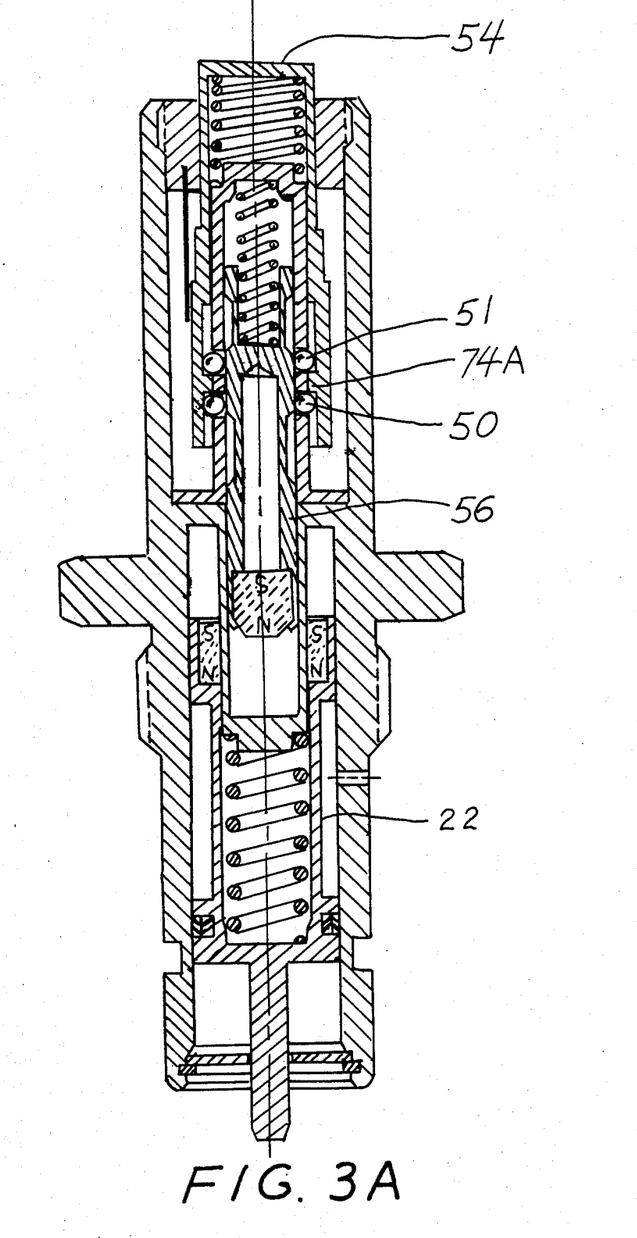
FIG. 3A is a section view similar to FIG. 3 showing the piston and control element in their initial positions as in FIG. 2 and preventing resetting of the signal indicator therein.

If the fluid system (not shown) that pumps fluid through the filter 32 is shut down before the second predetermined differential pressure is reached, the piston assembly 22, the control member 56 and both sets of locking balls 50 and 51, but not the signal member 54, will return to positions as shown in FIG. 2. Signal member 54 remains locked in the first indicating position shown in FIG. 3. The outwardly protruding balls 50 then engage the bottom shoulder of the ring 74A to prevent the signal member 54 from being pushed back to the nonindicating position. FIG. 3A shows this configuration. Resetting of the indicator can be accomplished only after the filter element 32 is removed, as will be described later.

If the fluid system continues operating after the first indication position of signal member 54 is achieved, the occurrence of a higher differential pressure drop across the filter element 32 will occur when more contaminants are accumulated therein. When the second predetermined differential pressure is attained, the piston assembly 22 will be moved to the third position, and the spring 34 will be compressed to a second predetermined height, as shown in FIG. 4. Simultaneously, the control member 56 is urged further upward (by an even stronger force applied by ring magnet 24) to the third site, as shown in FIG. 4, whereat the recess surface 68 of control member 56 is in radial alignment with locking balls 51. When this occurs, locking balls 51 are wedged radially inwardly and unlock the signal member 54 by allowing ring 74A, and hence signal member 54, to move upward to its "second indicating position".

The first and second indicating positions may be distinguished by colored bands (not shown) on the signal member 54. At the first indicating position, only such a band at the top of the signal member 54 is exposed. At the second indicating position, both an upper band and a lower adjacent red band would be exposed.

Now, after the fluid pumping system is shut down, the piston assembly 22, the control member 56, and both sets of locking balls 50 and 51 will return to positions shown in FIG. 2, while the signal member remains at the second indicating position. The protruding balls 51 then prevent the signal member 54 from being pushed back to the nonindicating position shown in FIG. 2.

It will be appreciated by those skilled in the art that, due to the small clearance between the locking balls 50 and 51 and holes 48, plus the small clearance between the surfaces 62 and 63 of control member 56 and the inside surface 64 of the retainer 42, the air trapped in the chamber 46 on both sides of the control member 56 effectively dampens the control member 56 against shock and vibration. In addition, the spring 70, unlike the second biasing spring in above-mentioned U.S. Pat. No. 2,942,572, which repels the second magnetic element to the indicating position, constantly repels the control member 56 in a direction that prevents actuation of the indicator 10 in response to shock and vibration.

At temperatures below the preselected value, which might be in the range from about 85 to 115 degrees Fahrenheit, the bimetallic element 78 contracts inwardly such that tip 80 engages the shoulder 82 on the signal member 54 to prevent upward motion of the signal member 54, as best seen in FIG. 5. When the temperature increases, the pressure drop across the filter element decreases, due to a decrease in the viscosity of the fluid being filtered. Thus, the piston assembly 22, the control member 56 and both sets of locking balls will return to positions shown in FIG. 2. As temperature increases above the preselected value, the bimetallic element 78 expands outwardly and allows the signal member to move to indicating positions when pressure drops reach the predetermined values.

Figure 6:
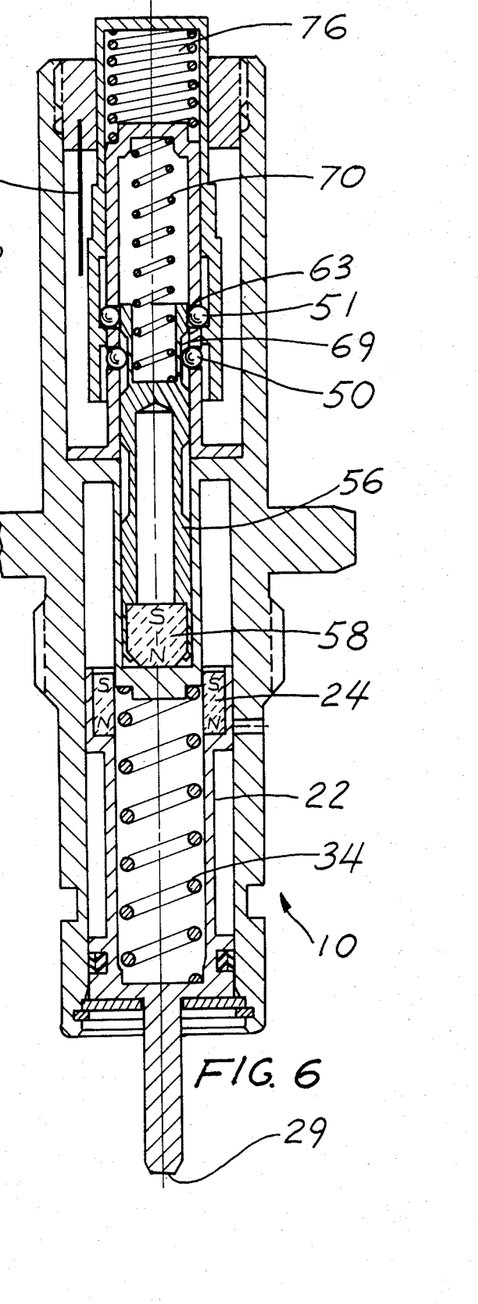
FIG. 6 is a longitudinal section view of the invention with the indicator in the first indicating position when no filter element is installed.

If no filter element is installed in the filter case, the piston assembly 22 will be urged by spring 34 to a rest position as shown in FIG. 6. The control member 56 moves to the position shown in FIG. 6, due to magnetic attraction between magnets 24 and 58 and the biasing force of spring 70, where surface 69 of the control member is in radial alignment with locking balls 50. This allows locking balls 50 to move radially inward and unlock the signal member 54, so bias spring 76 moves it upward to the first indicating position, as shown in FIG. 6, unless the temperature is below the preselected value, in which case the signal member 54 will be locked at its nonindicating position (as shown in FIGS. 2 and 5) by the bimetallic element 78. However, as soon as the temperature reaches above the preselected value, the bimetallic element 78 expands outwardly and allows the signal member 54 to move to the first indicating position, as shown in FIG. 6.

Resetting of the indicator requires removal of the filter element. After the filter element 32 is removed, the piston assembly 22 is free to move from the position shown in FIG. 2 to the position shown in FIG. 6. Meanwhile the control member 56 will move slowly, due to damping effect of the air trapped as above described, from the position shown in FIG. 2 to the position shown in FIG. 6. If the signal member 54 is in the first indicating position (shown in FIG. 3), it will be free to move to the second indicating position (shown in FIG. 4) when surface 69 of the control member is in radial alignment with locking balls 51. Surface 63 of the control member then keeps locking balls 51 in their outwardly protruding positions to lock the signal member 54 in the second indicating position.

During the process of installing a clean filter element 32 in the filter case, the end 29 of the piston assembly is pushed gradually by the end cap of the filter element from the position shown in FIG. 6 toward the position shown in FIG. 2. Simultaneously, the control member 56 is forced upward by the magnetic repulsion between magnets 24 and 58 from the position shown in FIG. 6 toward the position shown in FIG. 2. When the surface 69 of the control member 56 is in radial alignment with both sets of locking balls 50 and 51, the signal member 54 can be pushed down and held manually in the nonindicating position. The signal member 54 will be locked in the nonindicating position by protruding balls 50 when the installation of the filter element 32 is completed, as shown in FIG. 2.

Since resetting of the indicator is performed during installation of the filter element 32, this feature ensures that the filter element is always installed in the fluid system.

If the feature of indicating the absence of the filter element is not desired, the device can be simplified by omitting the recess 67 of control member 56. In this case, the length of the indicator 10 can be shortened considerably. One's finger or a suitable tool is then required for pushing on the end 29 of the piston assembly to reset the indicator.

The diffrential pressure indicating device of the present invention can be simplified to indicate only one predetermined differential pressure. This can be accomplished by simply omitting locking balls 51.

If the non-resetting feature of the device is not desired, surface 72 of the signal member 54 can be made to have the same diameter as surface 74. Then, after actuation, the locking balls 50 can no longer protrude outwardly to lock the signal member 54 in the first indicating position. Instead, the balls 50 prevent the control member 56 from moving from the positions shown in FIGS. 3 and 4 back to the position shown in FIG. 2 after actuation. In order to reset the differential pressure indicator 10, it is necessary merely to press downward on the signal member 54 to overcome the friction between locking balls and the extended surface 74 of the signal member. Once the signal member 74 is in its nonindicating position, the control member 56 is free to move back to the position shown in FIG. 2, and the locking balls 50 then will protrude outwardly to lock the signal member 54 in the nonindicating position.

Figure 7:
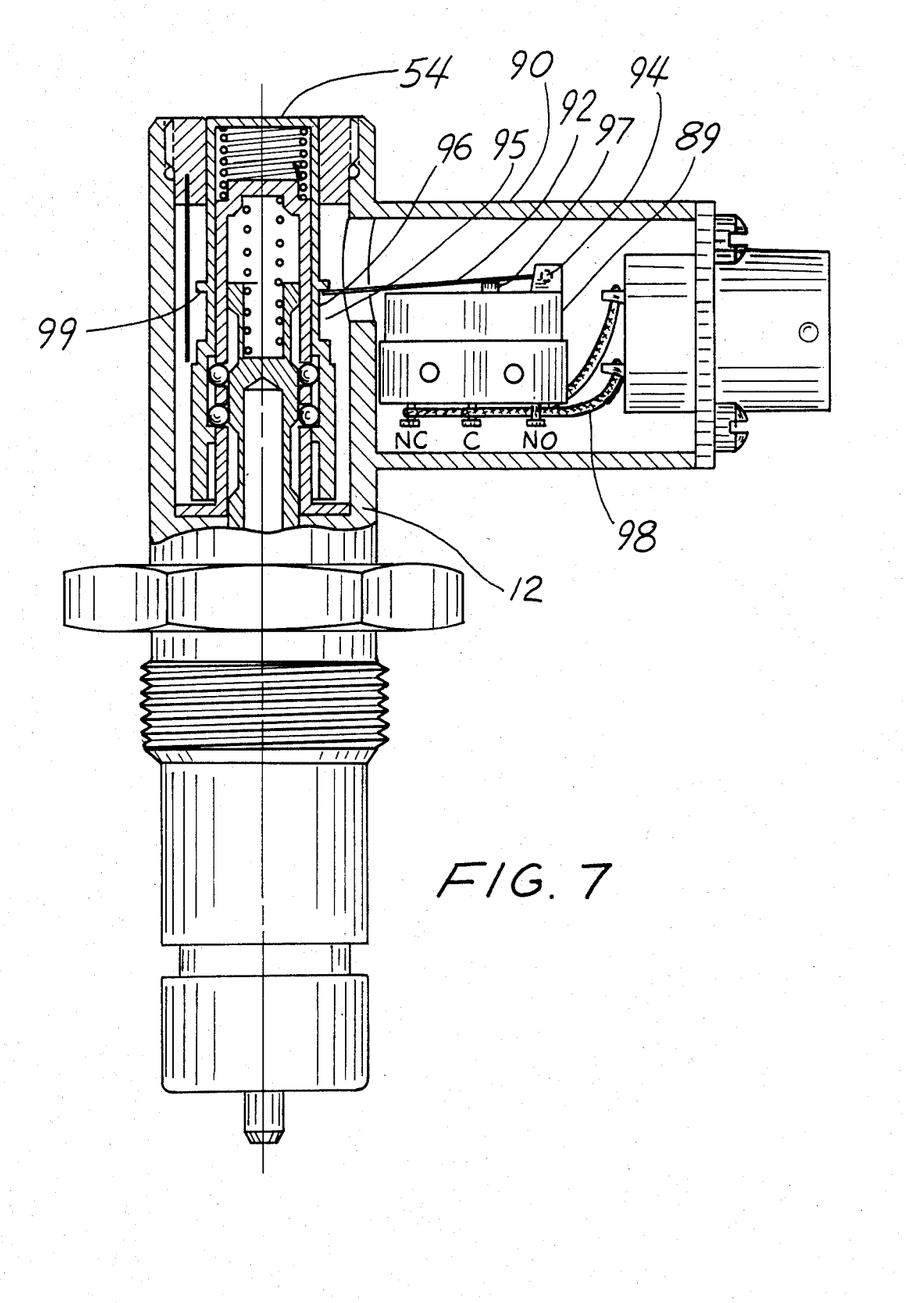
FIG. 7 is a longitudinal section view of another embodiment of the invention in which the indicator is arranged to actuate a switch.

The pressure indicator shown in FIG. 7 shows the indicator 10 of FIG. 2 modified to provide an electrical signal indicative of a clogged filter condition, in addition to providing a visual indication thereof. To provide a corresponding electrical signal when the signal member 54 moves to the first indicating position, a switch 89, which is a SPDT (Single Pole Double Throw) push button switch, is mounted in a housing 90 which as shown is a part of indicator housing 12, but need not be. Mounted on the switch is a lever 92 pivotally supported at 94 with one end projecting into recess 95 of signal member 54 but not touching the surface 96 to allow the signal member to move freely when the predetermined pressures are reached.

A switch actuator 97 in the form of push buttom is movable by the lever arm 92 to actuate the switch. When the switch actuator 97 is at free or extended position (not shown), suitable conductors 98 from the switch terminal C (Common) and terminal NC (Normally Closed) are arranged to complete a closed electrical circuit. When the switch actuator 97 is in its depressed position, as shown in FIG. 7, the above circuit is opened. When the signal member 54 is at its nonindicating position, as shown in FIG. 7, the switch 89 is positioned such that the lever 92 is in contact with shoulder 99 to depress the actuator 97 so that no signal is produced on conductors 98. When the signal member 54 is at the first indicating position, shoulder 99 is not in contact with the lever 92. The actuator 97 is free to be moved to the outwardly extended position by a spring inside the switch 89 so that an electrical signal is produced on conductor 98. Since the lever 92 is not in contact with the signal member 54 at the first indicating position (shown in FIG. 3), the signal member 54 is free to move to the second indicating position (shown in FIG. 4) when the second predetermined pressure is reached, and the electrical signal remains on conductors 98.

Figure 8:
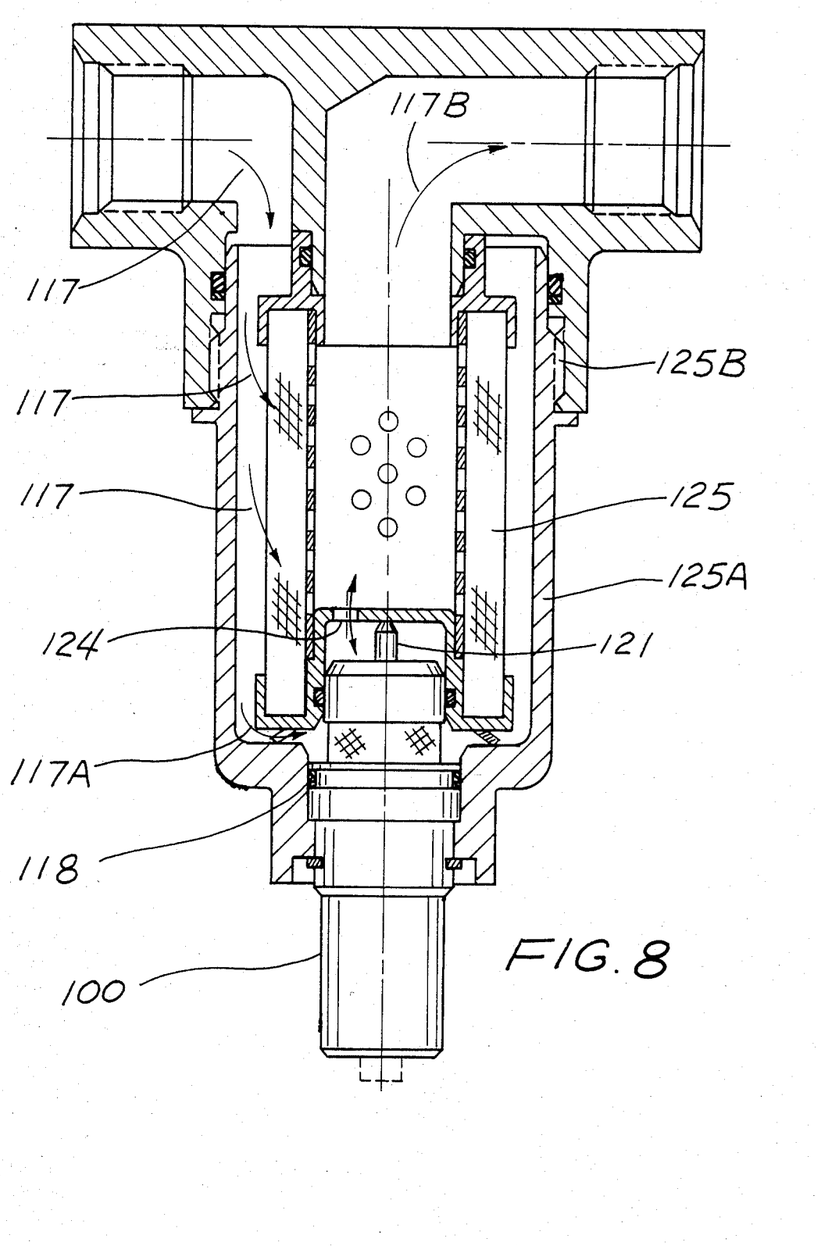
FIG. 8 is a view showing an embodiment of the invention installed at the bottom of a filter case.
Figure 9:
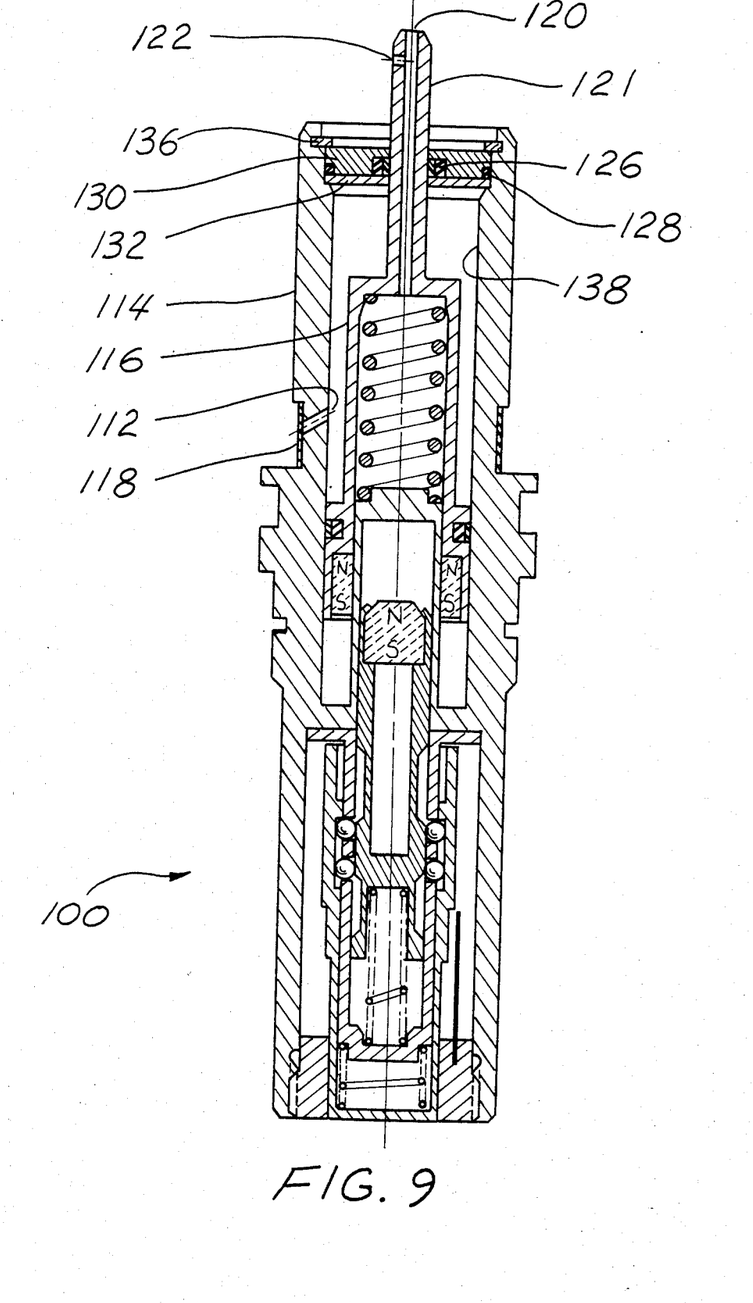
FIG. 9 is a longitudinal section view of the embodiment of the invention shown in FIG. 8 at its nonindicating position while a filter element is properly installed.

FIG. 8 shows another indicator 100 of the present invention, with a sectional view thereof being shown in FIG. 9. Differential pressure indicator mounted is at the bottom of a filter case. Fluid inlet passage 112 in housing 114 permits fluid inlet pressure to be applied to the effective upper surface area of the piston assembly 6. In order to prevent dirt carried by the incoming fluid from blocking the passage 112, possibly obstructing movement of the piston assembly 116, a suitable filter screen 118 is wrapped around the housing 114 and secured by, for example, weld or epoxy.

Longitudinal passage 120 and transverse fluid outlet hole 122 in piston rod 121 permit fluid communication between the outside top surface of piston assembly 116 and the inside effective lower surface area thereof. Low fluid pressure or the outlet side of the filter is sensed by, or is present at the outlet hole 122 (FIG. 8) because of hole 124 in the end cap of filter element 125, as shown in FIG. 8. Arrows 117 in FIG. 8 illustrate the path of high pressure inlet fluid passing through an inlet of the filter case and into the porous filtering walls of filter element 125. Arrow 117A illustrates a small portion of the high pressure inlet fluid passing into fluid inlet passage 112 of differential pressure indicator 100 of FIG. 8, through screen 118. Arrow 117B in FIG. 8 illustrates the passage of low pressure filtered fluid out of the outlet port of the filter head into which the filter case 125A is screwed by means of threads 125B. Seals 126 and 128 (FIG. 9) which are confined within grooves formed by washers 130 and 132 serve to prevent communication between inlet and outlet pressures. A retainer ring 136 secures washers 132 and 134 in place. This passage arrangement enables the piston assembly 116 to move in the same manner as piston assembly 24 of previously described indicator 10 under differential fluid pressures.

It should be noted that the pressure sensing area of the piston assembly 116 is the cross-sectional area of bore 138 minus that of rod 121. The rest of the constructions and operations are essentially the same as for indicator 10 described above.

Figures 10, 11:
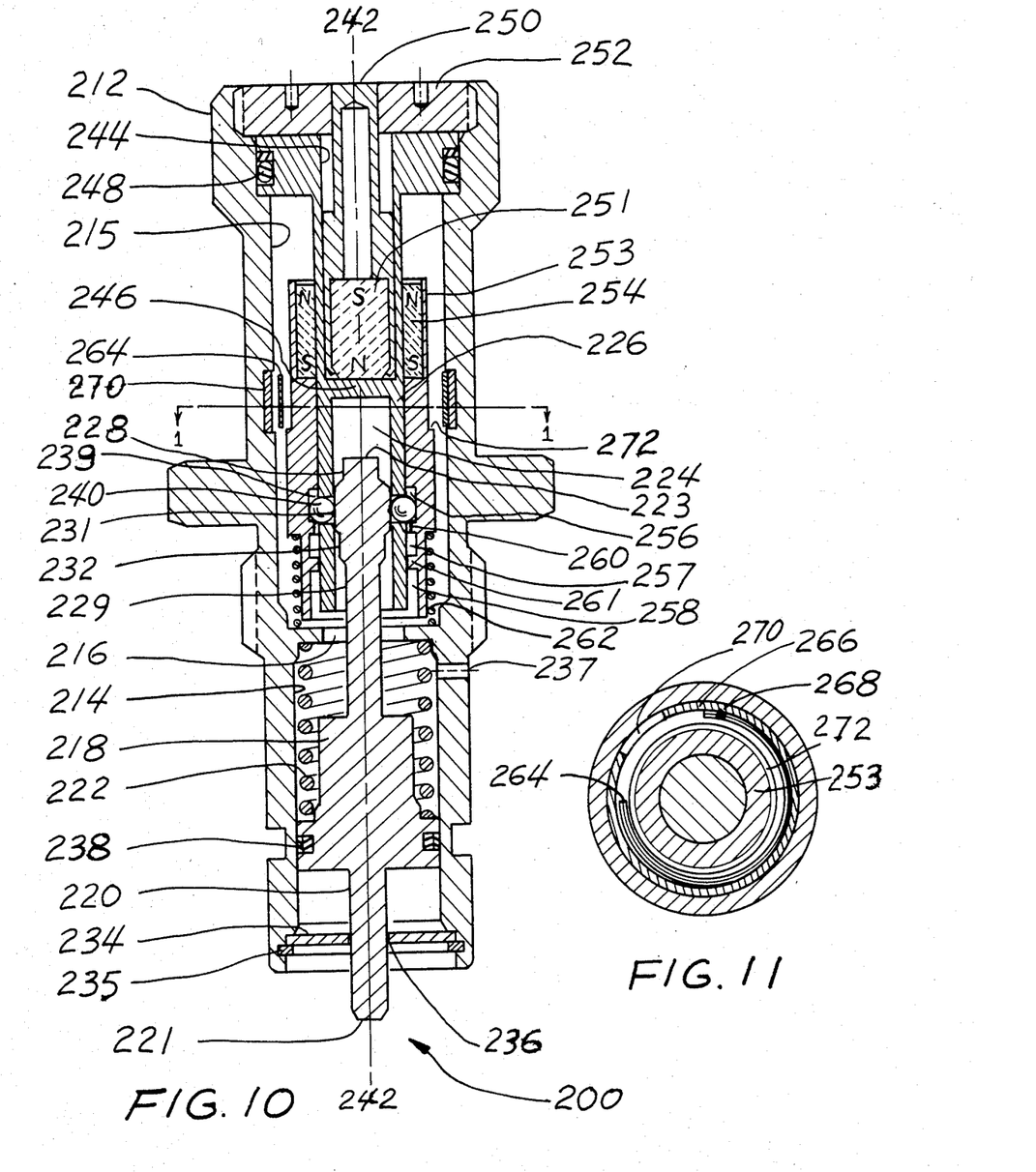
FIG. 10 is a longitudinal section view of another embodiment of the invention.
FIG. 11 is a section view taken on the section line 1—1 of FIG. 10 and looking in the direction of the arrows.

Many other variations on the above-described embodiments of the invention are possible. For example, FIG. 10 shows an indicator 200 that includes a housing 212 having a pair of bores 214 and 215 formed from the opposite ends thereof. Passage 216 communicates bore 214 with bore 215. Slidably mounted within bore 214 is a piston 218 having an extending rod 220 with an end 221. As before, the end 221 is normally urged against the end cap of a filter element (not shown) by a compression bias spring 222.

The other end 223 of the piston 218 extends through passage 216 into cavity 224 formed at the end of a ball retainer 226. The end 223 of piston 218 has outer surfaces 228 and 229 of the same diameter, and outer surfaces 231 and 232 of larger diameters, as shown.

A washer 234 and a retainer ring 235 are utilized to prevent the piston 218 from being driven out of the bore 214.

Passage or clearance hole 236 applies high inlet fluid pressure to the bottom surface of piston 218. Passage 237 applies low outlet fluid pressure to the effective top surface area of piston 218. A seal ring 238 prevents inlet and outlet pressures from communicating with each other.

The ball retainer 226 has a plurality of holes 239, equally spaced in a peripheral direction, respectively retaining a plurality of locking balls 240, with spherical centers disposed in a plane substantially at right angles to longitudinal axis 242. The ball retainer 226 further has a bore 244 which is prevented from communicating with cavity 224 by a partition 246. A seal ring 248 is utilized to prevent external fluid leakage.

Slidably mounted within the bore 244 is a signal member 250 which carries a magnet 251. A cap 252 which is threadably received within the end of housing 212 secures the ball retainer 226 in place and prevents the signal member 250 from being driven out of bore 244. Located within bore 215 is an actuator member 253 which carries a ring magnet 254. The actuator member 253 has inner recesses 256, 257, 258 of the same diameter. A first shoulder 260 is formed between recesses 256 and 257. A second shoulder 261, which protrudes radially inward further than shoulder 260, is formed between recesses 257 and 258. A spring 262 with preload less than the force of magnetic attraction between magnets 251 and 254 at the relative positions shown in FIG. 10 urges the actuator member 253 and signal member 250 upward toward "indicating position", due to the magnetic attraction.

At pressures below the first predetermined value, the surface 231 of the piston 218 maintains locking balls 240 in an outward or protruding position for abutment with the first shoulder 260, and thereby restrains the actuator member 253, together with the signal member (due to magnetic attraction), in the nonindicating position.

When the first predetermined pressure is reached the piston 218 is moved upward to a position wherein the surface 232 is in radial alignment with locking balss 240. This allows locking balls 240 to move radially inwardly, and unlocks the actuator member 253, together with the signal member 250 (due to magnetic attraction) to allow movement of the signal member 250 to the "first indicating positon", essentially as shown in FIG. 3. The abutment of the second shoulder 261 with locking balls 240 prevents the actuator member 253, together with the signal member (due to magnetic attraction), from moving to the second indicating position (as shown in FIG. 4). Recess 257 allows locking balls 240 to move outwardly to the protruding position when the system is shut down and the piston 218 is urged back to position as shown in FIG. 10. The protruding balls 240 then prevent the actuator member 253, together with the signal member, due to magnetic attraction, from being pushed back to the nonindicating position, as shown in FIG. 10.

When the second predetermined pressure is reached, the piston is moved to a position where surface 229 is in radial alignment with locking balls 240. This allows locking balls 240 to move radially inward and unlocks the actuator member 253, together with the signal member, due to magnetic attraction, for movement to the second indicating position. Recess 258 of actuator member 253 allows locking balls 240 to move outwardly to the protruding position when the system is shut down, to prevent resetting of the indicator externally.

It will be appreciated by those skilled in the art art that this embodiment has superb resistance against shock and vibration since the actuator member 253 is mechanically locked in place by protruding balls 240. Although severe shock and vibration could overcome the magnetic attraction between magnets 251 and 254 and separate the signal member from the actuator member, once the shock and vibration subside, the signal member will return to its original position due to magnetic attraction and no false indication due to shock and vibration will occur. Magnets 251 and 254 are of sufficient length that magnet 251 remains inside the ring magnet 254 all the time and no magnetic repulsion will occur.

In order to prevent false indication at low temperatures, a conventional bimetallic element 264 is mounted at one end on the inside surface of an open-ended ring 266 as by a weld 268 as best seen in FIG. 11. The ring 266 is made of material with spring characteristics to expand and engage in groove 270 once installed. The bimetallic element 264 is arranged to bend inwardly with decreasing temperatures. At normal temperatures, the bimetallic element has a minimum radius greater than that of flange 272 on the actuator member 253, thus permitting the actuator member, together with the signal member, due to magnetic attraction, to move to indicating positions when predetermined pressures are reached. However, at temperatures below a preselected value, the bimetallic element 264 contracts inwardly to engage the flange 4272 thus prevents actuation of the indicator.

If no filter element is installed in the filter case, the piston 218 will be urged by spring 222 toward the washer 234. Surface 228 is then in radial alignment with locking balls 240. This allows locking balls to move radially inwardly and unlocks the actuator member, together with the signal member due to magnetic attraction, for movement to the second indicating position.

Resetting of the indicator 200 requires removal of the filter element. After the filter element is removed, the piston 218 is urged by the spring 222 toward the washer 234. The surface 228 is then in radial alignment with locking balls 240. This allows locking balls to move radially inwardly. When the signal member 250 is pushed back to and held in the nonindicating position, the magnetic attraction between magnets 251 and 254 will overcome the force of spring 262 and move the actuator member 253 to the position as shown in FIG. 10. The actuator member 253, together with the signal member 250 due to the magnetic attraction, will be locked in the nonindicating position by protruding balls once the installation of a clean filter element is complete.

The advantage of indicator 200 over indicator 10 is that the bimetallic element 264 is immersed in the fluid being filtered so that it can sense fluid temperature directly. However, one additional seal 248 is required to prevent external leakage.

While the invention has been described to several embodiments thereof, those skilled in the art will be able to make various variations in the described embodiments without departing from the true spirit and scope of the invention. It is intended that all devices which are equivalent to those described herein in that they perform substantially the same work in substantially the same way to achieve substantially the same result are within the scope of the invention.

I claim:

1. A differential pressure indicating device for use in a fluid filtering system, comprising means for enabling use of a single indicator in the fluid filtering system to indicate both a partially clogged filter condition such that the filter should be changed and an entirely clogged filter condition such that the bypass valve is about to open or has opened, including in combination:
   (a) a housing having a first bore, and a second bore having a high pressure inlet thereto and a low pressure inlet thereto;
   (b) piston means for moving in the second bore in response to a change in a difference in fluid pressures of the high and low pressure inlets, and first bias means for urging the piston means in a predetermined direction;
   (c) indicating means for
      i. moving in the first bore from a first position indicating that a clean filter is installed in a filter assembly that includes a filter casing and a filter head to a second position indicating that the filter is at least partially clogged and
      ii. moving in the first bore from the second position to a third position indicating the filter is so dangerously clogged that fluid is about to bypass the filter or is bypassing the filter,
   the filter head having an inlet in open communication with the high pressure inlet and an outlet in open communication with the low pressure inlet,
   (d) second bias means for urging the indicating means in a predetermined direction;
   (e) locking means responsive to the piston means, for limiting the movement of the indicating means to lock the indicating means into the first position if the filter is clean and is properly installed, releasing the indicating means if the difference in fluid pressure exceeds a first level to allow the indicating means to move to the second position, and preventing the indicating means from returning to the first position until the filter is removed; and
   (f) control means extending into the first and second bores for magnetically coupling the piston means to the locking means to cause the locking means to limit the movement of the indicating means in accordance with the position of the piston means, and third bias means for urging the control means in a predetermined direction.

2. The differential pressure indicating device of claim 1 wherein the locking means includes means for retaining the indicating means in the second position until the difference in fluid pressure exceeds a second level greater than the first level, and then releasing the indicating means to allow the indicating means to move to the third position.

3. The differential pressure indicating device of claim 1 wherein the first, second, and third bias means each include a respective compression spring, the first bias means urging the piston means downward, the second bias means urging the indicating means upward, and the third bias means urging the control means downward.

4. The differential pressure indicating device of claim 1 wherein the high pressure inlet of the housing is located to produce an upward force on an effective bottom surface area of the piston means and the low pressure inlet of the housing is located to produce a downward force on an effective upper surface area of the piston means, whereby an increase in the difference in fluid pressures of the high and low pressure inlets causes the piston means to move upward in the second bore.

5. The differential pressure indicating device of claim 1 wherein the high pressure inlet of the housing is located to produce a downward force on an effective upper surface area of the piston means and the low pressure inlet of the housing is located to produce an upward force on an effective bottom surface area of the piston means, whereby an increase in the difference in fluid pressures of the high and low pressure inlets causes the piston means to move downward in the second bore.

6. The differential pressure indicating device of claim 1 wherein the locking means includes at least one detent ball supported in a detent ball retaining wall attached in fixed relationship to the housing and having a wall thickness that is less than the diameter of the detent ball and is disposed between a surface of the control means and a surface of the indicating means.

7. The differential pressure indicating device of claim 6 wherein a surface of the control means includes at least one recess, and wherein the surface of the indicating means adjacent to the detent ball retaining wall has at least one recess therein, the control means being vertically movable in accordance with the position of the piston means to align the recesses with the detent ball to lock the indicating means into the first position if the filter is both clean and properly installed, and to release the indicating means from the first position to the second position if the difference in fluid pressures exceeds the second level.

8. The differential pressure indicating device of claim 6 including a first magnet attached to an upper end of the piston means and a second magnet attached to the lower end of the control means to effectuate the magnetic coupling.

9. The differential pressure indicating device of claim 8 wherein the first bore, the second bore, the piston means, the indicating means, the locking means, and the control means all have cylindrical cross-sections.

10. The differential pressure indicating device of claim 9 wherein the first bias means includes a compression spring disposed inside the piston means, the second bias means includes a compression spring disposed inside the indicating means, and the third bias means includes a compression spring disposed inside the detent ball retaining wall.

11. The differential pressure indicating device of claim 10 wherein the indicating means is hollow, the detent ball retaining wall is hollow and is disposed inside the indicating means, and wherein the control means is disposed partially inside the detent ball retaining wall and partially disposed within the upper portion of the second bore, the first and second magnets being disposed in repelling relationship to each other.

12. The differential pressure indicating device of claim 11 including first and second sets of detent retaining balls disposed in the locking means, the first set of detent balls engaging a first shoulder in the indicating means to lock the indicating mean into the first position before the difference in the pressures exceeds the first level and releasing the indicating means when the difference in the fluid pressure exceeds the first level, the second set of detent balls engaging the first shoulder in the indicating means to limit upward movement of the indicating means at the second position, the first set of detent balls engaging a second shoulder in the indicating means to prevent external depressing of the indicating means from second position to the first position, the second set of detent balls releasing the indicating means from the second position and allowing it to move upward to the third position after the difference in fluid pressures exceeds the second level, the first set of detent balls being movable away from the second shoulder thereby allowing depressing of the indicating means to the first position after the filter element has been removed.

13. The differential pressure indicating device of claim 12 further including temperature sensitive locking means for engaging the indicating means to prevent movement of the indicating means from the first position to the second position until the temperature of fluid in the fluid filtering system exceeds a predetermined level, to thereby prevent the high viscosity of low temperature fluid from increasing the difference in fluid pressures and thereby actuating the differential indicating device.

14. The differential pressure indicating device of claim 1 wherein the locking means includes means for preventing the indicating means from being returned by application of external force to the first position until the filter is removed.

15. A differential pressure indicating deivce for use in a fluid filtering system, comprising means for enabling use of a single indicator in the fluid filtering system to indicate both a partially clogged filter condition such that the filter should be changed and an entirely clogged filter condition such that the bypass valve is about to open or has opened, including in combination:
 (a) a housing having a first bore, and a second bore having a high pressure inlet thereto and a low pressure inlet thereto;
 (b) piston means for moving in the second bore in response to a change in a difference in fluid pressures of the high and low pressure inlets, and first bias means for urging the piston means in a predetermined direction;
 (c) indicating means for
  i. moving in the first bore from a first position indicating that a clean filter is installed in a filter assembly that includes a filter casing and a filter head to a second position indicating that the filter is at least partially clogged and
  ii. moving in the first bore from the second postion to a third position indicating the filter is so dangerously clogged that fluid is about to bypass the filter or is bypassing the filter,
 the filter head having an inlet in open communication with the high pressure inlet and an outlet in open communication with the low pressure inlet;
 (d) second bias means for urging the indicating means in a predetermined direction;
 (e) locking means responsive to the piston means for limiting the movement of the indicating means in the first position if the filter is clean and is properly installed, releasing the indicating means and allowing the second bias means to move the indicating means to the second position if the difference in fluid pressure exceeds a first level, and preventing the indicating means from being returned to and remaining in the first position until the filter is removed.

16. The differential pressure indicating device claim 15 wherein the indicating means can move in the first bore from the second position to a third indicating the filter is so clogged that fluid is bypassing the filter, and wherein the locking means includes means for retaining the indicating means in the second position until the difference in fluid pressure exceeds a second level greater than the first level, and then releasing the indicating means to allow the indicating means to move to the third position.

17. A differential pressure indicating device for use in a fluid filtering system, comprising means for enabling use of a single indicator in the fluid filtering system to indicate a partially clogged filter condition such that the filter should be changed and indicating a condition in which io filter is installed in the fluid filtering system, including:
 (a) a housing having a first bore, and a second bore having a high pressure inlet thereto and a low pressure inlet thereto;
 (b) piston means for moving in the second bore in response to a change in a difference in fluid pressures of the high and low pressure inlets, and first bias means for urging the piston means in a predetermined direction;
 (c) indicating means for i. moving in the first bore from a first position indicating that a clean filter is installed in a filter assembly that includes a filter casing and a filter head to a second position indicating that the filter is at least partially clogged, ii. remaining in the second position as long as no filter element is installed in the fluid filtering system, the filter head having an inlet in open communication with the high pressure inlet and an outlet in open communication with the low pressure inlet, and iii. second bias means for urging the indicating means in a predetermined direction;

(d) locking means responsive to the piston means, for limiting the movement of the indicating means to lock the indicating means into the first position if the filter is clean and is properly installed, releasing the indicating means if the difference in fluid pressure exceeds a first level to allow the indicating means to move to the second position, and preventing the indicating means from returning to and remaining in the first position until the filter is removed; and (e) control means extending into the first and second bores for magnetically coupling the piston means to the locking means to cause the locking means to limit the movement of the indicating means in accordance with the position of the piston means, and third bias menas for urging the control means in a predetermined direction.

18. The differential pressure indicating device of claim 17 wherein the piston means includes filter position sensing means engaging the filter and limiting the amount of movement of the piston in the predetermined direction when the filter is installed and allowing the piston to move a predetermined distance in the predetermined direction when the filter is removed, the locking means responding to movement of the piston by the predetermined distance to prevent the indicating means from being locked in the first position until the filter position sensing means engages a properly installed filter.

* * * * *